United States Patent [19]

McFiggans et al.

[11] 3,742,456

[45] June 26, 1973

[54] APPARATUS FOR SELECTIVELY FORMATTING SERIAL DATA BITS INTO SEPARATE DATA CHARACTERS

[75] Inventors: Robert B. McFiggans, Stamford; Howell A. Jones, Jr., Fairfield, both of Conn.

[73] Assignee: Pitney-Bowes, Inc., Stamford, Conn.

[22] Filed: Apr. 5, 1972

[21] Appl. No.: 241,265

[52] U.S. Cl. .................... 340/172.5

[51] Int. Cl. .................... G06f 1/00

[58] Field of Search .................... 340/172.5, 174 SR; 307/221 R, 221 A, 221 B, 221 C; 328/37

[56] References Cited

UNITED STATES PATENTS

| | | | |
|---|---|---|---|
| 3,544,967 | 12/1970 | Sallach et al. | 340/172.5 |
| 2,911,622 | 11/1959 | Ayres et al. | 340/172.5 X |
| 3,652,998 | 3/1972 | Forney, Jr. | 340/172.5 |
| 3,209,332 | 9/1965 | Doersam, Jr. | 340/172.5 |
| 3,230,514 | 1/1966 | Kliman | 340/172.5 |
| 3,267,437 | 8/1966 | Harwood | 340/172.5 |
| 3,274,909 | 9/1966 | Hauerbach | 340/172.5 X |
| 3,307,152 | 2/1967 | Robbins | 340/172.5 |
| 3,540,004 | 11/1970 | Hansen | 340/172.5 |
| 3,543,247 | 11/1970 | Schrem | 340/172.5 |

*Primary Examiner*—Paul J. Henon
*Assistant Examiner*—Melvin B. Chapnick
*Attorney*—William D. Soltow, Jr., Robert A. Cahill et al.

[57] ABSTRACT

Interface apparatus which formats bits of data serially received from, for example, a data casette into preassigned groups of bits, such as, for example, alphanumerics which are transmitted in parallel to a data utilization device, such as, for example, a digital computer. The interface apparatus includes at least one shift register which is preshifted a number of positions before accepting data bits and then serially receives the data bits which are also shifted in the register. When a given total number of shifts has occurred, the contents of the shift register are transferred bits in parallel to the data utilization device.

4 Claims, 1 Drawing Figure

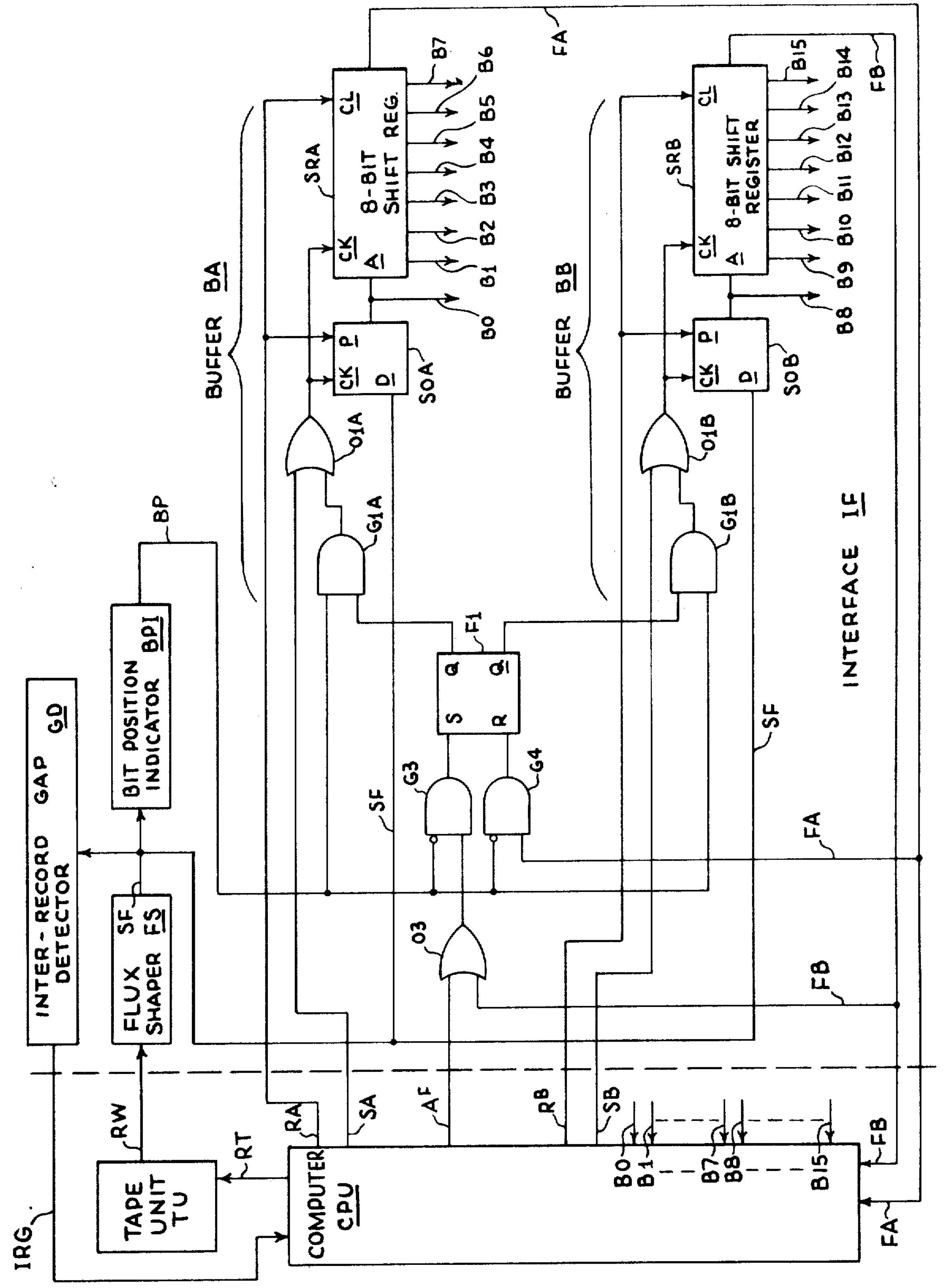
INTER-RECORD GAP DETECTOR GD
FLUX SHAPER FS
BIT POSITION INDICATOR BPI
TAPE UNIT TU
COMPUTER CPU
BUFFER BA
BUFFER BB
8-BIT SHIFT REG.
8-BIT SHIFT REGISTER
INTERFACE IF
SRA
SRB
SOA
SOB
O1A
O1B
G1A
G1B
G3
G4
O3
F1
IRG
RW
RT
RA
SA
AF
RB
SB
SF
BP
FA
FB
B0 B1 B7 B8 B15

APPARATUS FOR SELECTIVELY FORMATTING SERIAL DATA BITS INTO SEPARATE DATA CHARACTERS

BACKGROUND OF THE INVENTION

This invention pertains to data interfaces and, more particularly, to data interfaces which format serially received data bits into groups of parallel data bits.

With many data processing systems it is becoming more common for the data to be captured at remote acquisition units and then forwarded to a central processor for processing. Of the many systems a very important application involves point-of-transaction devices such as electronic cash registers in merchandising facilities. In effect, all information about a sale such as the kind of item sold and the selling price is recorded for forwarding to the central processor where account and inventory balances are kept. Lately, for non-real time systems, it has become popular to use magnetic cassette systems as the record medium so that the point-of-transaction device records the data on the cassette which is then physically transferred to a cassette reader connected to the processor via an interface.

While most recording on the cassettes is in a bit serial configuration, there are innumerable ways of formatting the bits which represent the alphanumerics of the data. For example, some recorders use five-bit characters, others eight-bit characters. Some use preamble bits, postamble bits, parity bits, etc. Therefore, in order for the processor to intelligently process the data represented by a serial stream of bits, the bits of the serial stream must be grouped or formatted to represent their proper significance.

At present, there are two common solutions available. One, called "polling," consists of bringing the raw data (serial streams of bits) into the processor directly, and deciphering all information with a complex real-time program. Such a method gives great format independence, but has the disadvantages of requiring a highly complex program, precluding the overlapping of operations, and, in the case of high data rate devices may be difficult to achieve. The other solution contemplates a fixed hardware interface which transmits complete characters to the processor. While this solution eliminates many of the problems of the "polling" solution, it is expensive and, more importantly, can be used for only one format, i.e., given number of bits per character, etc.

It is, accordingly, a general object of the invention to provide improved universal formatting apparatus which requires less programing time of the processor.

It is another object of the invention to provide bit formatting apparatus which can easily handle different size characters to service many diverse magnetic tape cassette devices.

SUMMARY OF THE INVENTION

Briefly, the invention contemplates apparatus for formatting serially received bits of data into preassigned groups of bits for transmission to a data utilization device. The apparatus comprises at least one multistage shift register for serially receiving the data bits wherein the register shifts at least one position each time it receives a bit. Format positioning means are provided for shifting the shift register a given number of positions when the shift register is not receiving bits. Means operate upon the indication of a predetermined total number of shifts of the shift register to transfer its contents in parallel to a data utilization device.

Other objects, the features and advantages of the invention will be apparent from the following detailed description when read with the accompanying drawing, whose sole FIGURE shows, by way of example, and not limitation, the presently preferred embodiment of the invention.

BRIEF DESCRIPTION OF THE DRAWING

The sole FIGURE of the drawing is a detailed block diagram of a format independent interface for arranging serially received data bits into separate data characters.

DESCRIPTION OF THE PREFERRED EMBODIMENT

The sole FIGURE shows in block diagram form an interface IF connecting a tape unit TU to a digital computer CPU. Although the tape unit TU can take many forms it will be considered as being a magnetic tape cassette device wherein the transport portion drives the tape past a reproducing head in response to a signal on line RT from computer CPU. In addition, the bits of data are recorded on the magnetic tape serially using phase-coded techniques. It should be noted that the invention is not restricted to such specific examples but contemplates any serial data bit source and coding techniques. Furthermore, the bits of data are grouped in a particular format which is previously known, for example, five-bit coded characters. It should be noted that other formats such as four bits or eight bits per character, with or without preamble, postamble and parity bits could equally be used. Finally, at the end of the bits of data there is the recording of an inter-record gap in the form of a constant polarity of magnetization lasting longer than two bit times.

The computer CPU can be a programed minicomputer having parallel-output registers for emitting timed control signals and parallel-input registers for receiving data bits and control signals. Such minicomputers are well known and will only be discussed with respect to their interaction with tape unit TU and interface IF.

Interface IF includes signal processing circuits for processing the raw data on line RW from tape unit TU and comprises: flux shaper FS which filters out high frequency noise and sharpens the edges of the signal representing the flux changes, flux shaper FS can take many forms such as a low pass filter or integrator connected between line RW and a Schmitt trigger-type circuit; and bit position indicator BPI which emits signals which only permit the recording of phase transitions at the start of a bit time and not in the middle of a bit time, bit position indicator BPI can take many forms such as a pair of non-retriggerable single-shot circuits one triggerable on positive transitions, the other on negative transitions to generate relative narrow pulses of the same polarity which are fed to another non-retriggerable single-shot circuit which emits pulses lasting for about three-quarters of a bit time. The invention is not limited to such bit processing circuits but could comprise other circuits such as a two-input exclusive OR-circuit receiving the raw data directly and also delayed to trigger single-shot circuits.

The inter record gap detector circuit GD of the interface IF can be a retriggerable single-shot circuit which when initially triggered will emit a voltage level and continue to emit such level until the time lapse after the receipt of a trigger pulse is greater than two and one-half bit times.

The remainder of the interface IF centers around buffers BA and BB which alternately receive the raw data on line SF from the flux shaper FS and transmit formatted characters on lines B0 to B7 and lines B8 to B15, respectively, to computer CPU. Each buffer is the same. Essentially, buffer BA comprises a nine stage shift register composed of one-bit stage SOA in cascade with eight-bit shift register SRA. The bits are received at the D input of stage SOA from line SF and shifting is performed by the output of OR-circuit 01A. The data outputs of the first eight states are connected via lines B0 to B7 to computer CPU. The ninth stage output which is connected to line FA does not represent data but indicates, as will hereinafter become apparent, when the buffer BA is ready to transfer its contents. The buffer BA is set in a particular way at the start of the operation and after every transfer by a signal from the computer CPU on line RA. More specifically, a signal on line RA sets stage SOA to binary 1 and sets the eight stages of SRA to binary 0. Thus, it should be apparent that only after eight shifts of the buffer BA will there be a binary 1 on line FA to indicate the buffer is "full" and ready for transferring data. Shifting of the buffer BA is controlled from two sources. One is when data is actually entering the buffer BA, at that time AND-circuit G1A passes pulses from line BP to one input of OR-circuit O1A; the other is when data is not being received by buffer BA, at that time a predetermined number of formating shift pulses are transmitted from computer CPU, via line SA, to the other input of OR-circuit O1A.

Buffer BB is identical with buffer BA in construction and operation. Therefore, it will not be described except to state that the last character of each element or signal associated with buffer BB is a B while the corresponding character associated with buffer BA is an A. The remaining circuitry of interface IF centers around set-reset flip-flop F1 which determines which of the buffers is to receive data at any given time. In particular, when flip-flop F1 is set AND-circuit G1A is open, and AND-circuit G1B is closed; and when flip-flop F1 is reset the AND-circuits reverse states.

Flip-flop F1 is set by a signal through AND-circuit G3 from OR-circuit 03; and flip-flop F1 is reset by a signal through AND-circuit G4 from line FA. Note, the second inputs of each of these AND-circuits are inverting inputs connected to line BP to insure that flip-flop (and buffer) switching do not occur during a bit position time. Finally, OR-circuit 03 receives either a signal on line AF from computer CPU at the start of the operation and thereafter receives signals on line FB.

Generally, in operating the system, one buffer receives bits from tape unit TU while the other buffer transmits its contents to computer CPU, is then cleared and set in the particular manner described above, and then shifted a number of positions according to the desired format. When the one buffer is "full," i.e., after a total of eight shifts for that buffer, the buffers interchange roles. stage. Also, In particular, assume the input data is five-bit characters. Computer CPU is set to handle five-bit characters. With respect to the formatting this requires that when called upon, the computer will emit a burst of three formatting shift pulses. If seven-bit characters were being formatted then the computer would be programed to emit a single shift pulse.

In any event, at the start of the operation the computer CPU transmits a signal on line RT to start tape unit TU moving, transmits signals on line RA and RB to clear both buffers BA and BB, transmits a signal on line AF to set flip-flop F1 for opening buffer BA to receive the bits and for blocking buffer BB, and transmits three pulses on each of the lines SA and SB to shift the preset binary 1 in the first stage to the fourth stage of each of the buffers BA and BB (assuming five-bit characters). The first five data bits from tape unit TU pass via line SF to each of the buffers BA and BB, however, only buffer BA receives the clocking pulses on line BP from bit position indicator BPI. When the fifth bit has entered buffer BA, the preset binary 1 has been shifted eight times and is in the last stage of buffer BA causing a signal on line FA. The signal on line FA signals computer CPU to accept the bits on lines B0 to B7 from the first eight stages of buffer BA. Note, the bits on lines B5, B6 and B7 are binary 0 and the bits on lines B0 to B4 represent the five bits of the character being transferred. In addition, after accepting the character, the computer CPU emits a signal on line RA to preset buffer BA and three pulses only on line SA to shift the preset binary 1 in the first stage to the fourth stage. Also the signal on line FA from buffer BA resets flip-flop F1 to block AND-gate G1A and open AND-gate G1B.

The next five bits on line SF enter buffer BB while the preset binary 1 is shifted from stage four to stage nine resulting in the generation of a signal on line FB. This signal alerts computer CPU to accept the bits on lines B8 to B15. Again note, the bits on lines B13, B14 and B15 are binary 0 while the bits on lines B8 to B12 represent the second-five bit character. The computer CPU, after accepting the character, generates a signal on line RB to preset buffer BB and transmits three pulses on line SB to shift the preset binary 1 of the first stage to the fourth stage. In addition, the signal on line FB sets flip-flop F1 to open AND-circuit G1A and block AND-circuit G1B.

After five bits have entered buffer BA a signal is again generated on line FA. Thereafter, the operation continues as described above from the generation of the first signal on line FA until the inter-record gap is detected by gap detector GD. At that time, a signal is transmitted via line IRG to computer CPU to terminate the operation.

While many different components may be used in the interface, stages SOA and SOB are types Serial Number 7474 D-type edge triggered flip-flops, shift registers SRA and SRB are types SN 74164 eight-bit parallel output serial shifter registers while the AND-and OR-circuits utilize positive logic.

In addition, while it is preferred to use a single shift register to store data bits and the "full" indicator bit and, thus, save hardware, one could use separate parallel shift registers for the data and the "full" indicator bit.

In addition, whereas it is preferable and simplifies operation of the computer to shift the preset "full" indicator bit before entering data into the buffer one could shift that bit after entry of the data.

There has thus been shown an improved interface for formatting serially received bits of data into characters of known numbers of bits by utilizing a buffer which is shifted a certain number of positions related to the character format before transferring the character to a utilization device. There has also been shown an economical means utilizing the same elements to indicate when the formatting has been accomplished. Furthermore, by alternately using two buffers the formatting can be performed at higher speeds than otherwise.

While only one embodiment of the invention has been shown and described in detail, there will now be obvious to those skilled in the artmany other modifications and variations satisfying many or all of the objects of the invention but which do not depart from the spirit thereof as defined in the appended claims.

What is claimed is:

1. Apparatus for formatting serially received data bits into separate data characters for parallel data bit, serial data character transmission to a data utilization device, said apparatus comprising:

A. at least one shift register having a given number of stages,

B. initializing means for entering an indicator bit of one bit value into an input stage of said one shift register and clearing the remaining stages thereof to a bit value opposite said one bit value, C. means for shifting said one shift register one position with the receipt of each data bit at said input stage, D. format positioning means for shifting said one shift register in the absence of incoming data bits a given number of positions equal to one less than the number of stages minus the number of data bits in each character, and E. means for sensing when said indicator bit is shifted into a last stage of said one shift register to initiate acceptance by the utilization device of a data character transmission from said one shift register and for actuating said initializing means.

2. The apparatus of claim 1, wherein said format positioning means operates subsequent to said initializing means and prior to the receipt of data bits of a data character at said input stage.

3. The apparatus of claim 1, further comprising:

A. another shift register corresponding to said one shift register,

B. other initializing means for entering an indicator bit of said one bit value in an input stage of said other shift register and clearing the remaining stages thereof to said opposite bit value, C. other means for shifting said other shift register one position with the receipt of each data bit at said input stage thereof, D. other format positioning means for shifting said other shift register in the absence of incoming data bits a given number of positions equal to one less than the number of stages thereof minus the number of data bits in each data character, E. other means for sensing when said indicator bit is shifted into a last stage of said other shift register to initiate acceptance by the utilization device of a data character transmission from said other shift register and for actuating said other initializing means, and F. control means for routing data characters alternately to said shift registers under the control of both said sensing means.

4. The apparatus defined in claim 3, wherein said format positioning means are operative subsequent to their respectively associated initializing means and prior to the receipt of data characters at the input stages of their respectively associated shift registers.

* * * * *

UNITED STATES PATENT OFFICE
CERTIFICATE OF CORRECTION

Patent No. 3742456 Dated June 26, 1973

Inventor(s) Robert B. McFiggans and Howell A. Jones, Jr.

It is certified that error appears in the above-identified patent and that said Letters Patent are hereby corrected as shown below:

Column 3 Line 45, change "F1" to --F2--.

Signed and sealed this 18th day of February 1975.

(SEAL)
Attest:

RUTH C. MASON
Attesting Officer

C. MARSHALL DANN
Commissioner of Patents and Trademarks